(12) United States Patent
Okada et al.

(10) Patent No.: US 7,354,566 B2
(45) Date of Patent: Apr. 8, 2008

(54) FUEL GAS PRODUCTION METHOD AND APPARATUS

(75) Inventors: Hikaru Okada, Asaka (JP); Hiroshi Machida, Utsunomiya (JP); Nobuyoshi Yoshida, Saitama-ken (JP)

(73) Assignees: Honda Motor Co., Ltd., Tokyo (JP); Sumitomo Seika Chemicals Co., Ltd., Hyogo (JP)

( * ) Notice: Subject to any disclaimer, the term of this patent is extended or adjusted under 35 U.S.C. 154(b) by 478 days.

(21) Appl. No.: 10/869,173

(22) Filed: Jun. 16, 2004

(65) Prior Publication Data

US 2004/0250472 A1    Dec. 16, 2004

(30) Foreign Application Priority Data

Jun. 16, 2003  (JP) ............................. 2003-170961

(51) Int. Cl.
*C01B 3/26* (2006.01)
*B01J 8/04* (2006.01)

(52) U.S. Cl. .................. 423/651; 422/188; 422/211
(58) Field of Classification Search ................ 422/188, 422/211; 423/651
See application file for complete search history.

(56) References Cited

U.S. PATENT DOCUMENTS 6,497,856 B1 * 12/2002 Lomax et al. .............. 423/651

FOREIGN PATENT DOCUMENTS

| JP | 2002-020102 | 1/2002 |
|---|---|---|
| JP | 2002-053307 | 2/2002 |
| JP | 2002-068708 | 3/2002 |

* cited by examiner

*Primary Examiner*—Glenn Caldarola
*Assistant Examiner*—Randy Boyer
(74) *Attorney, Agent, or Firm*—Lahive & Cockfield, LLP; Anthony A. Laurentano, Esq.

(57) ABSTRACT

A fuel gas production apparatus includes a vaporization mechanism, a reforming mechanism, a PSA mechanism, a supply passage, a combustion air supply mechanism and an ECU. The vaporization mechanism has a combustion catalyst for vaporizing a fuel. The reforming mechanism reforms the vaporized fuel to obtain a reformed gas. The PSA mechanism refines the reformed gas by removing impurities to produce a fuel gas. The impurities removed by the PSA mechanism are continuously supplied as a heat source fuel to the vaporization mechanism through the supply passage. The combustion air supply mechanism supplies combustion air to the vaporization mechanism. The ECU controls the amount of the combustion air supplied to the vaporization mechanism synchronously with the change in the amount of heat energy of the impurities supplied to the vaporization mechanism.

5 Claims, 8 Drawing Sheets

FUEL GAS PRODUCTION METHOD AND APPARATUS

BACKGROUND OF THE INVENTION

1. Field of the Invention

The present invention relates to a fuel gas production method and apparatus for reforming a fuel containing hydrocarbon or alcohol to produce a hydrogen-rich fuel gas.

2. Description of the Related Art

For example, a solid polymer electrolyte fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly is interposed between a pair of separators. The membrane electrode assembly and the separators make up a unit cell for generating electricity. Generally, a plurality of the unit cells are stacked together to form a fuel cell stack. The fuel cell stack has been used widely in various applications including stationary and mobile applications.

In the unit cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte membrane, and the electrons flow through an external circuit to the cathode, creating a DC electric current.

Conventionally, hydrocarbon fuels such as natural gas or hydrogen-containing fuels such as alcohols (e.g. methanol) are refined to produce the hydrogen-containing gas as the fuel gas, and the hydrogen-containing gas is supplied to the fuel cell stack.

For example, Japanese laid-open patent publication No. 2000-20102 discloses a hydrogen production apparatus as shown in FIG. 8. The hydrogen production apparatus includes a compressor 1, a hydrodesulfurization unit 2, a steam reformer 3, a catalyst combustor 4, a gas shift converter 5, and a PSA (Pressure Swing Adsorption) unit 6. A fuel such as city gas is supplied from the compressor 1 to the hydrodesulfurization unit 2. After sulfur is removed from the fuel, the fuel is reformed by the steam reformer 3 to produce a gas having a high hydrogen-concentration (hydrogen-containing gas). The catalyst combustor 4 is provided around the steam reformer 3 for inducing combustion of hydrogen and oxygen in the air by the action of the catalyst. The gas shift converter 5 converts carbon monoxide in the hydrogen-containing gas into carbon dioxide and hydrogen. After the gas shift reaction, the PSA unit 6 produces highly pure hydrogen from the hydrogen-containing gas by pressure swing adsorption.

A hydrogen tank 8 and an off gas holder 9 are connected to the PSA unit 6. The hydrogen tank 8 temporarily stores pure hydrogen before it is supplied to a polymer electrolyte fuel cell (PEFC) 7. The off gas holder 9 temporarily stores the off gas (impurities) collected by pressure swing adsorption of the PSA unit 6. The off gas holder 9 supplies the off gas to the catalyst combustor 4 as a fuel for heating the steam reformer 3.

The PAS unit 6 has a plurality of adsorption towers filed with adsorbent material for selectively absorbing impurities (components other than hydrogen) under high pressure, and releasing the absorbed components under low pressure. The impurities in the hydrogen-containing gas are absorbed by the adsorption towers under high pressure leaving the hydrogen in the gas container, and the hydrogen is removed as the purified hydrogen product. After the hydrogen is removed, the impurities are released from the adsorption towers under low pressure. The waste gas containing the impurities is discharged from the PSA unit 6 as the off gas. Series of operations, i.e., absorption of the impurities, reduction of pressure to release the impurities, replacement of the gas, and pressure increase are carried out as an cycle for collecting the highly pure hydrogen, and discharging the other components as the off gas.

The off gas holder 9 has a considerably large volume for maintaining the desired pressure difference in the PSA unit 6. A large space is required for installing the off gas holder 9. The hydrogen production apparatus is considerably large as a whole.

Therefore, it is suggested to directly supply the off gas to the catalyst combustor 4 from the PSA unit 6 without using the off gas holder 9. In this case, the off gas discharged from the PSA unit 6 is affected by pressure pulsation. Thus, the amount of the off gas supplied to the PSA unit 6 to the catalyst combustor 4 fluctuates undesirably. The temperature of the catalyst of the catalyst combustor 4 is likely to fluctuate.

In particular, when the temperature of the catalyst is low, CO and unreformed HC in the off gas are not fully combusted in the catalyst combustor 4, and discharged directly to the outside. For example, at the temperature of 500° C. or less, methane ($CH_4$) is not fully used in the combustion induced by the action of the catalyst, and the unused methane is discharged as an exhaust gas to the outside. Therefore, the exhaust gas is not clean.

SUMMARY OF THE INVENTION

A main object of the present invention is to provide a fuel gas production method and apparatus without using any off gas holder in which the exhaust gas is clean, and it is possible to produce a hydrogen-rich fuel gas efficiently.

According to the present invention, a fuel is reformed to obtain a reformed gas. The reformed gas is supplied to a PSA mechanism for removing impurities from the reformed gas to produce a hydrogen-rich fuel gas.

The impurities are continuously supplied from the PSA mechanism to a heating unit as a heat source fuel. Further, combustion air is supplied to the heating unit to induce combustion. At this time, the amount of the heat energy of the impurities supplied to the heating unit is controlled synchronously with the amount of combustion air supplied to the heating unit. When the amount of the heat energy of the impurities supplied to the heating unit is decreased due to the pulsation of the PSA mechanism, the amount of combustion air supplied to the heating unit is decreased.

Thus, even if the amount of the combustion air supplied to the heating unit is increased in contrast to the heat energy supplied to the heat source fuel, it is possible to prevent the temperature of the heating unit from being decreased. Combustible component is fully used in the heating unit. Therefore, no unused combustible component is discharged directly to the outside. The exhaust gas is clean.

Further, a fuel gas production apparatus according to the present invention comprises a vaporization mechanism having a combustion catalyst for vaporizing the fuel, a reforming mechanism for reforming the vaporized fuel to obtain a reformed gas, a pressure swing adsorption mechanism for removing impurities from the reformed gas to refine the reformed gas into a fuel gas, a supply passage for continuously supplying the impurities discharged from the pressure swing adsorption mechanism to the combustion catalyst or another unit which requires a heat source fuel, a combustion air supply mechanism for supplying combustion air to the combustion catalyst, and a control unit for controlling the amount of the combustion air supplied to the heating unit synchronously with the change in the amount of heat energy of the impurities supplied to the combustion catalyst.

The amount of the heat source fuel (impurities) supplied from the PSA mechanism fluctuates by the pressure pulsation of the PSA mechanism. If the cycle time of the PSA mechanism is constant, the pressure pulsation has a regular cycle. Thus, the combustion air supply mechanism controls the supply of combustion air in timing with the cycle time of the PSA mechanism. Thus, the change in the amount of the heat energy of the heat source fuel is synchronized with the change in the amount of the combustion air highly accurately. With the simple structure, the combustible component is fully used in the combustion, and thus, no unused combustible component is discharged to the outside.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
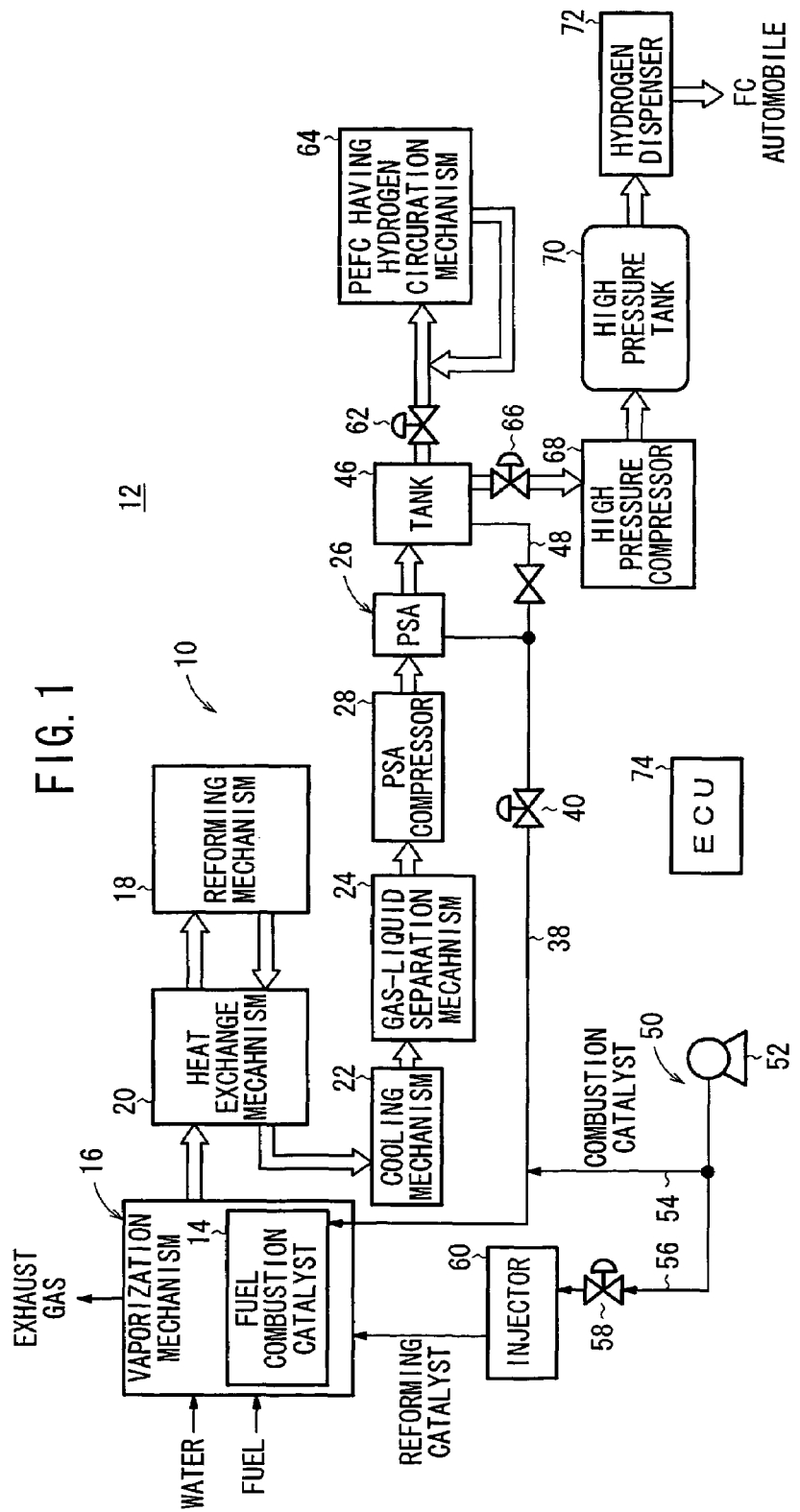
FIG. 1 is a diagram schematically showing a fuel gas supply system including a fuel gas production apparatus according to an embodiment of the present invention.

FIG. 1 is a diagram schematically showing a fuel gas supply system 12 including a fuel gas production apparatus 10 according to an embodiment of the present invention.

The fuel gas production apparatus 10 includes a vaporization mechanism 16 having a combustion catalyst (heating unit) 14 for vaporizing a fuel. At the downstream of the vaporization mechanism 16, a reforming mechanism 18 is provided for obtaining a reformed gas from the fuel. A heat exchange mechanism 20 is provided between the vaporization mechanism 16 and the reforming mechanism 18. The heat exchange mechanism 20 heats the reforming mechanism 18 by exchanging the heat between the vaporized fuel and the reformed gas. At the downstream of the heat exchange mechanism 20, a cooling mechanism 22 is provided for cooling the reformed gas after the heat exchange has been performed. At the downstream of the cooling mechanism 22, a gas-liquid separation mechanism 24 is provided for separating gas component and water component in the reformed gas.

Figure 2:
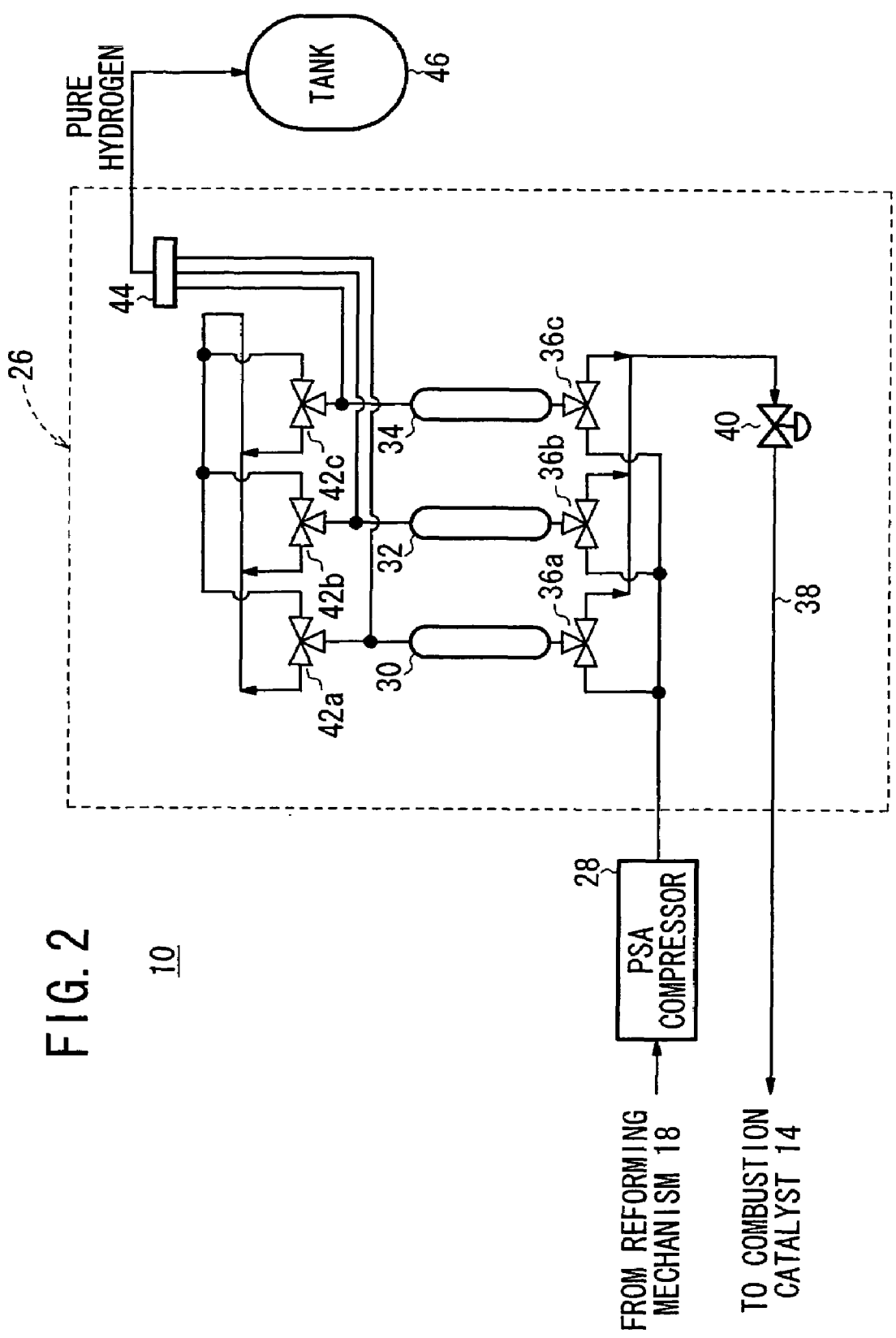
FIG. 2 is a diagram showing main components of the fuel gas production apparatus.

At the downstream of the gas-liquid separation mechanism 24, a PSA compressor 28 is provided. After the water component is removed from the reformed gas, the PSA compressor 28 supplies the reformed gas under pressure to a PSA mechanism 26. As shown in FIG. 2, the PSA mechanism 26 includes a tri-tower pressure swing adsorption apparatus, for example. The pressure swing adsorption apparatus has adsorption towers 30, 32, 34, which are connectable to the PSA compressor 28. Each of the adsorption towers 30, 32, 34 has lower and upper ports. Valves 36a through 36c are connected to the lower ports of the adsorption towers 30 through 34, respectively so that the adsorption towers 30 through 34 can be selectively connected to a supply passage 38. The supply passage 38 is connected to the combustion catalyst 14 through a pressure control valve 40.

Valves 42a through 42c are connected to the upper ports of the adsorption towers 30 through 34. Further, the adsorption towers 30 through 34 are connectable to a tank 46 through a valve 44. The tank 46 is connected to the supply passage 38 through a pipe 48. A combustion air supply mechanism 50 is connected to the supply passage 38.

The combustion air supply mechanism 50 includes an air compressor 52 which also functions as a reforming air supply mechanism. A combustion air supply passage 54 and a reforming air supply passage 56 are connected to the air compressor 52. The combustion air supply passage 54 is connected to the middle of the supply passage 38 for supplying the combustion air to the combustion catalyst 14. A pressure control valve 58 and an injector 60 are provided in the reforming air supply passage 56 for supplying the reforming air to the vaporization mechanism 16 together with the reforming fuel and water.

The tank 46 is connectable to a fuel gas flow field (not shown) in a polymer electrolyte fuel cell (PEFC) stack 64. The flow rate or the pressure of the fuel gas supplied from the tank 46 to the fuel gas flow field is controlled by a valve 62. Further, the tank 46 is connectable to a high pressure tank 70 through a flow rate control valve 66 and a high pressure compressor 68. The high pressure tank 70 supplies hydrogen to a hydrogen dispenser 72 for supplying the hydrogen to an unillustrated fuel cell automobile (FC automobile) through the hydrogen dispenser 72. The fuel cell stack 64 is used in a stationary application, and has a hydrogen (fuel) circulation system.

The fuel gas supply system 12 performs communication with, and controls auxiliary devices. In the embodiment of the present invention, for example, an ECU (Electronic Control Unit) 74 is provided for controlling the amount of combustion air supplied to the combustion catalyst 14 synchronously with the change in the amount of heat energy of impurities (heat source fuel) supplied to the combustion catalyst 14 from the PSA mechanism 26.

Figure 3:
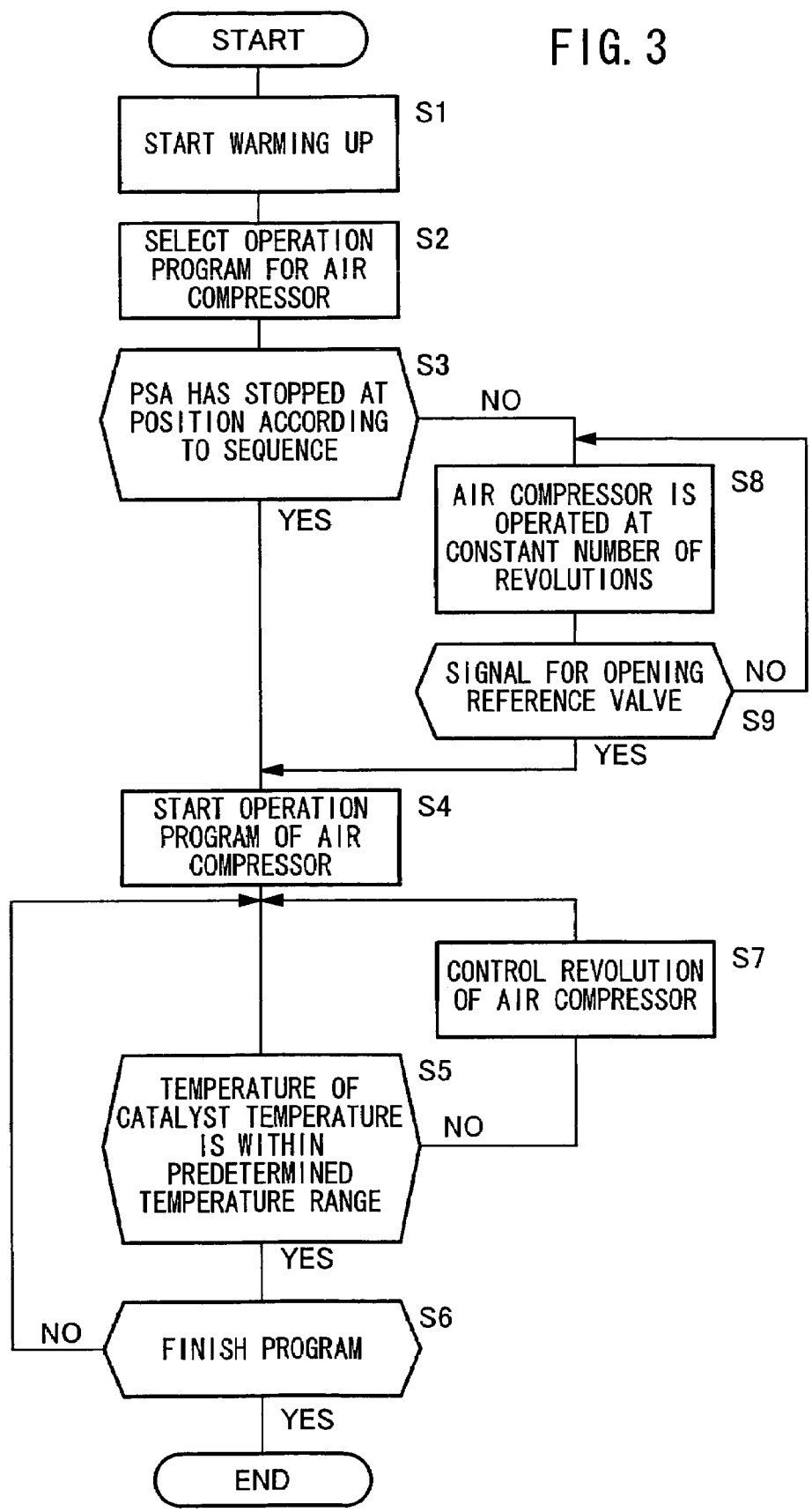
FIG. 3 is a flowchart showing a method of producing a fuel gas according to the present invention.

Next, operation of the fuel gas production apparatus 10 and the method of producing the fuel gas will be described with reference to a flowchart shown in FIG. 3.

In the fuel gas supply system 12, when a starting signal is outputted from the ECU 74, warming up operation of the fuel gas production apparatus 10 is started (step S1). In the warming up operation, the air compressor 52 is operated at a constant number of revolutions for supplying the combustion air to the combustion catalyst 14 through the combustion air supply passage 54 and supplying the reforming air to the vaporization mechanism 16 through the reforming air supply passage 56.

In the reforming air supply passage 56, the pressure difference (the fluctuation of pressure) of the reforming air from the air compressor 52 is reduced, and the reforming air flows through the injector 60 so that the reforming air is regulated at a substantially constant pressure before it is supplied to the vaporization mechanism 16.

In addition to the reforming air, the reforming fuel and water are supplied to the vaporization mechanism 16. The combustion air is supplied to the combustion catalyst 14, and hydrogen is supplied to the combustion catalyst 14 from the tank 46 as necessary for inducing combustion and vaporizing the reforming fuel into steam. The vaporized fuel is supplied to the reforming mechanism 18 through the heat exchange mechanism 20 such that heat exchange occurs between the reforming fuel and the reformed gas from the reforming mechanism 18 for heating the reforming mechanism 18.

The reforming mechanism 18 induces oxidation reaction $CH_4+2O_2 \rightarrow CO_2+2H_2O$ (exothermic reaction) of the methane, oxygen, and water vapor in the air, for example, and fuel reforming reaction $CH_4+2H_2O \rightarrow CO_2+4H$ (endothermic reaction) simultaneously (autothermal reforming process).

Figure 4:
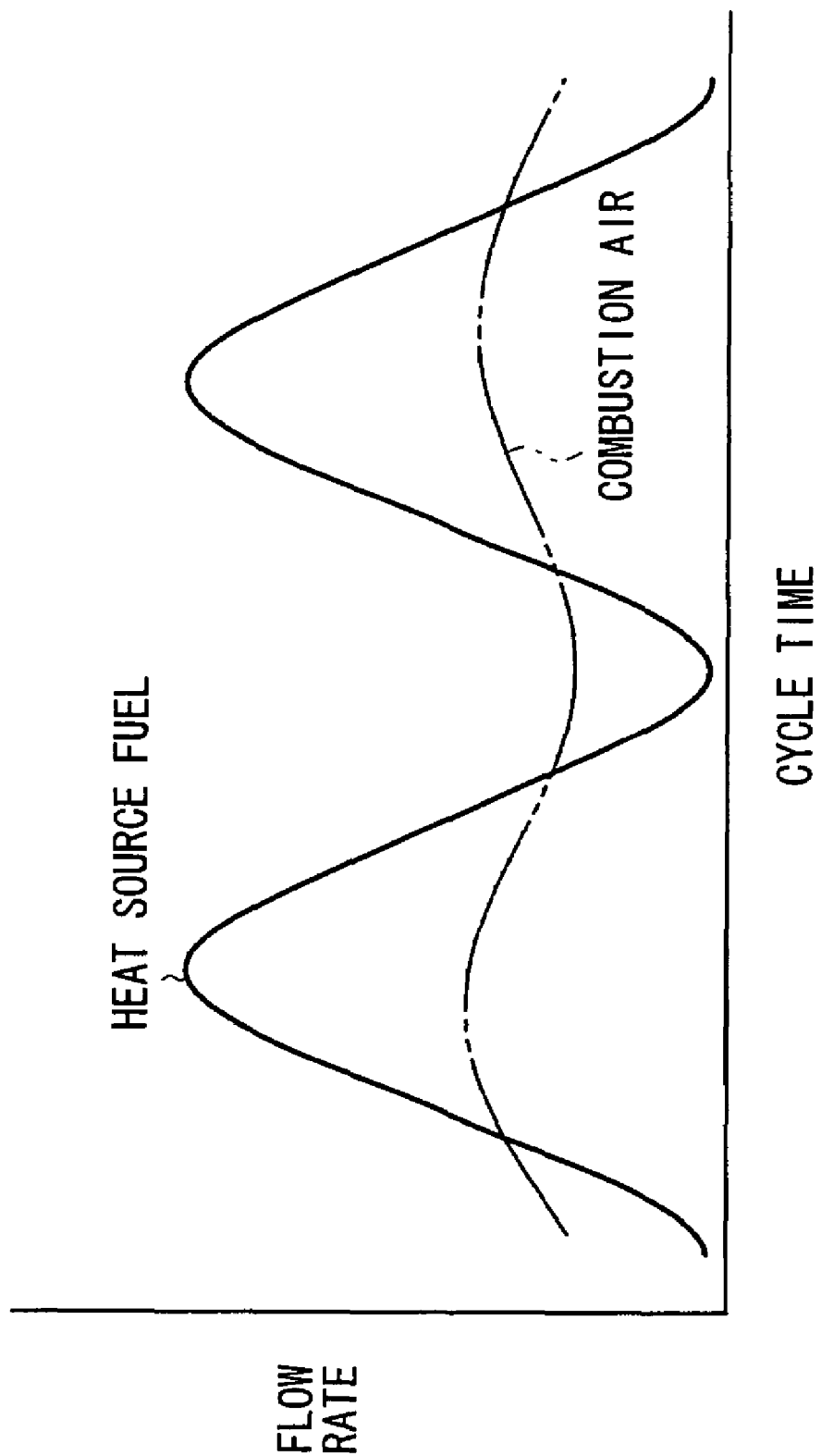
FIG. 4 is a graph for controlling the flow rates of a heat source fuel and combustion air.

In this manner, the warming up operation of the fuel gas production apparatus is carried out. The ECU 74 selects an operation program of the air compressor 52 based on the cycle time of the PSA mechanism 26 (step S2). For example, as shown in FIG. 4, the flow rate (heat energy) of the impurities (heat source fuel) discharged from the PSA mechanism 26 is not stable by the pressure pulsation. The operating program is designed to change the flow rate of the combustion air synchronously with the flow rate of the heat source fuel.

Then, in step S3, it is judged whether the operation of the PSA mechanism 26 has stopped previously according to a predetermined sequence, e.g., whether the adsorption towers has stopped according to predetermined positions. If it is judged that the operation of the PSA mechanism 26 has stopped previously according to the predetermined sequence (YES in step S3), the control passes to step S4 for starting the operation program of the air compressor 52.

Thus, the reformed gas is supplied from the reforming mechanism 18 to the heat exchange mechanism 20. The heat of the reformed gas and the heat of the reforming fuel are exchanged. Then, the reformed gas is cooled by the cooling mechanism 22, and supplied to the gas-liquid separation mechanism 24. After the water component is removed from the reformed gas, the reformed gas is compressed by the PSA compressor 28, and supplied to the PSA mechanism 26.

As shown in FIG. 2, the reformed gas is selectively supplied to the adsorption towers 30, 32, 34 of the PSA mechanism 26. For example, the PSA mechanism 26 absorbs impurities in the adsorption tower 30, reduces the pressure in the adsorption tower 32, and purges the waste gas in the adsorption tower 34. Thus, the components other than hydrogen are absorbed in the adsorption tower 30, and a hydrogen-rich pure fuel gas (fuel gas having high concentration of hydrogen) is supplied to the tank 46.

After the absorbing step in the adsorption tower 30, and the pressure equalization step in the adsorption tower 32 are performed, the absorbing step in the adsorption tower 30, blowing down step in the adsorption tower 32, and the pressure increasing step in the adsorption tower 34 are performed. The off gas (impurities) discharged from the adsorption tower 30 is supplied to the supply passage 38 when the valve 36a is open, and then, supplied to the combustion catalyst 14 through the pressure control valve 40.

As described above, in the adsorption towers 30, 32, 34, the series of operations, i.e., adsorption of the impurities, reduction of pressure, purge of waste gas, pressure equalization, and blowing down are selectively performed to produce the hydrogen-rich pure fuel gas, and the fuel gas is supplied to the tank 46. Further, the off gas is continuously supplied to the combustion catalyst 14 through the supply passage 38 by opening/closing action of the valves 36a through 36c.

In the embodiment of the present invention, as shown in FIG. 4, the operation program of the air compressor 52 is selected based on the sequence of the PSA mechanism. Specifically, the air compressor 52 is controlled to adjust the flow rate of the combustion air synchronously with the change of the heat energy of the impurities (heat source fuel) due to the pressure pulsation in the PSA mechanism 26.

When the amount of heat energy of the heat source fuel supplied to the combustion catalyst 14 decreases, the amount of combustion air supplied to the combustion catalyst 14 decreases. Therefore, it is possible to prevent the decrease of temperature of the combustion catalyst 14.

The heat source fuel is fully used in the combustion. Thus, no unused combustible component is directly discharged to the outside. The exhaust gas is clean.

Figure 5:
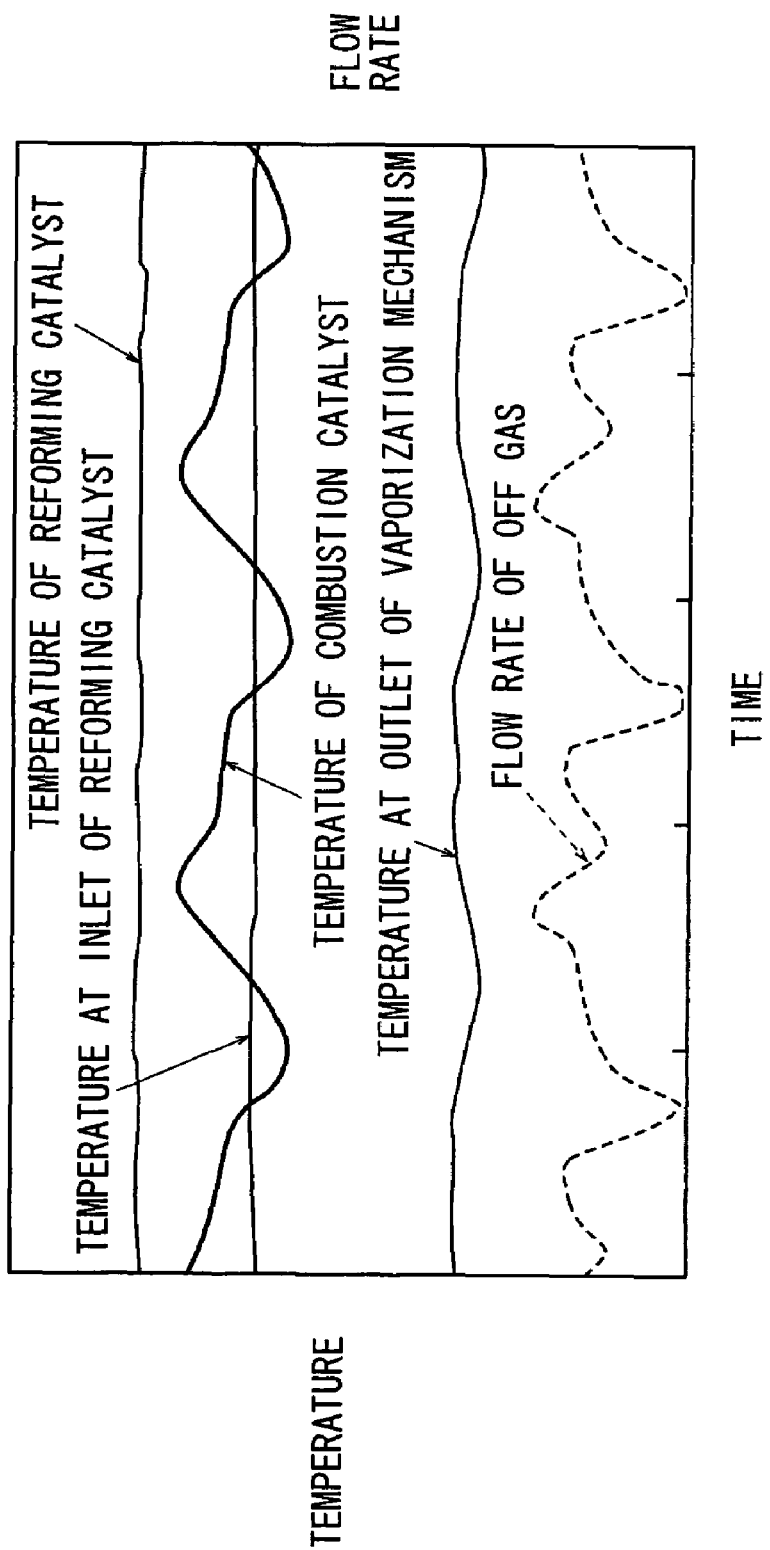
FIG. 5 is a graph showing relationship between the off gas flow rate and temperatures of components when the air flow rate is constant.

FIG. 5 is a view showing the change of the temperatures of components of the fuel gas production apparatus 10, and the change (pulsation) of the flow rate of the off gas. The amount of the combustion air supplied to the combustion catalyst 14 is constant, i.e., the number of revolutions of the air compressor 52 is constant. The heat source fuel discharged from the PSA mechanism 26 is controlled by the pressure control valve 40. As shown in FIG. 5, when the flow rate of the heat source fuel is decreased due to the pulsation of the off gas, the amount of the combustion air supplied to the combustion catalyst 14 is relatively increased. Therefore, the temperature of the combustion catalyst 14 is decreased.

Figure 6:
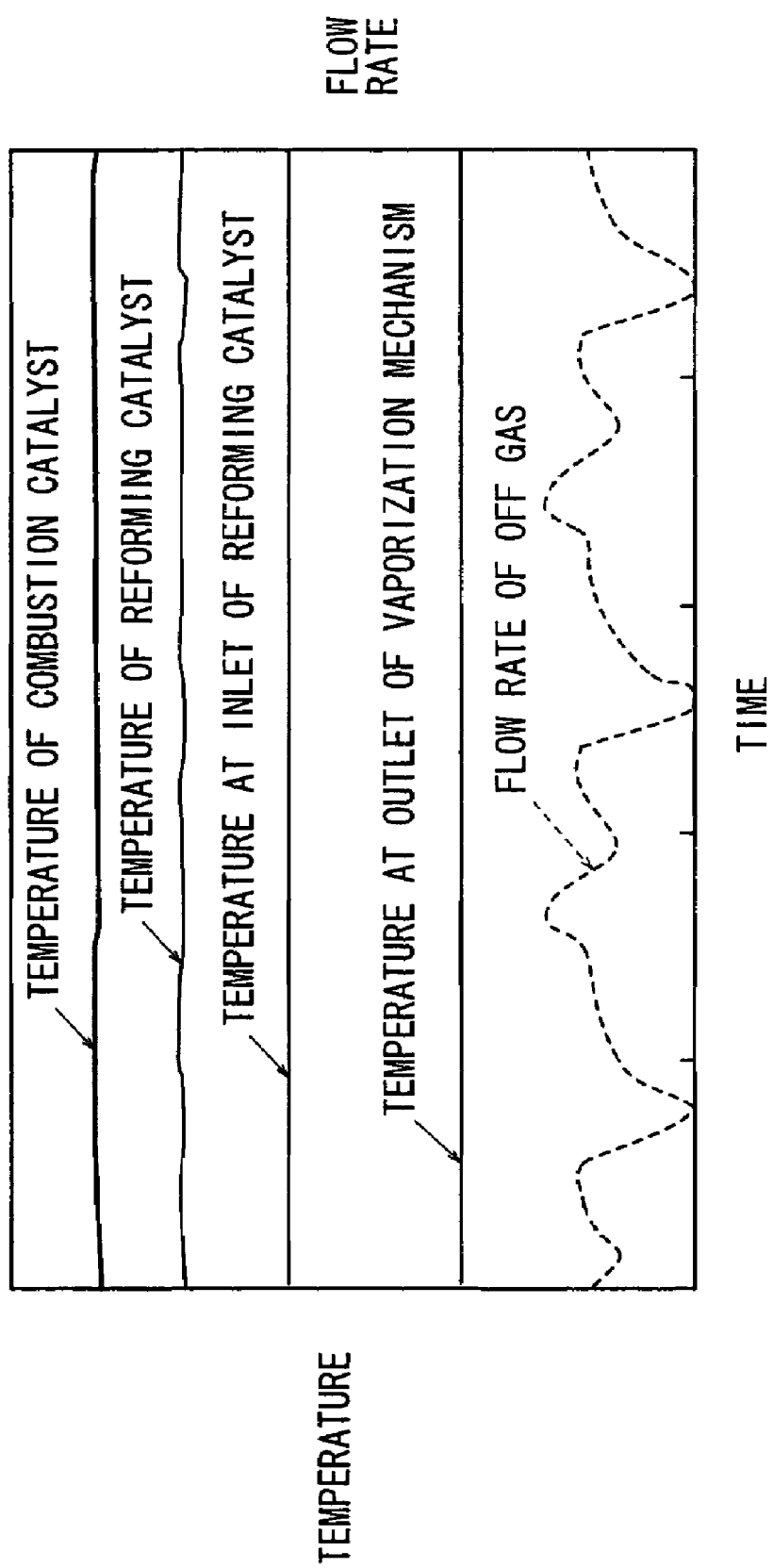
FIG. 6 is a graph showing the off gas flow rate and temperatures of the components when the air flow rate is controlled.

If the air compressor is controlled synchronously with the pulsation of the off gas, as shown in FIG. 6, the combustion catalyst 14 is stably maintained at high temperature regardless of the change (pulsation) of the flow rate of the off gas. Thus, the amount of the unused combustible component (e.g., $CH_4$) in the exhaust gas is greatly reduced in contrast to the case of FIG. 5.

Then, the control passes to step S5 for judging whether the temperature of the combustion catalyst 14 is within a predetermined temperature range or not. If the temperature of the combustion catalyst 14 is within the predetermined temperature range (YES in step S5), the operation continues until the program is finished (step S6).

If the temperature of the combustion catalyst 14 is not within the predetermined temperature range (NO in step S5), the control passes to step S7 for controlling the revolution of the air compressor 52. Thus, the temperature of the combustion catalyst 14 is maintained within a predetermined range of temperature.

If the PSA mechanism 26 has not stopped according to the sequence previously, the control passes to step S8. In step S8, the operation of the air compressor 52 is started synchronously with the start of the operation of the PSA mechanism 26. At the time of starting the operation, the number of revolutions of the air compressor 52 is maintained at a predetermined number or less.

Figure 7:
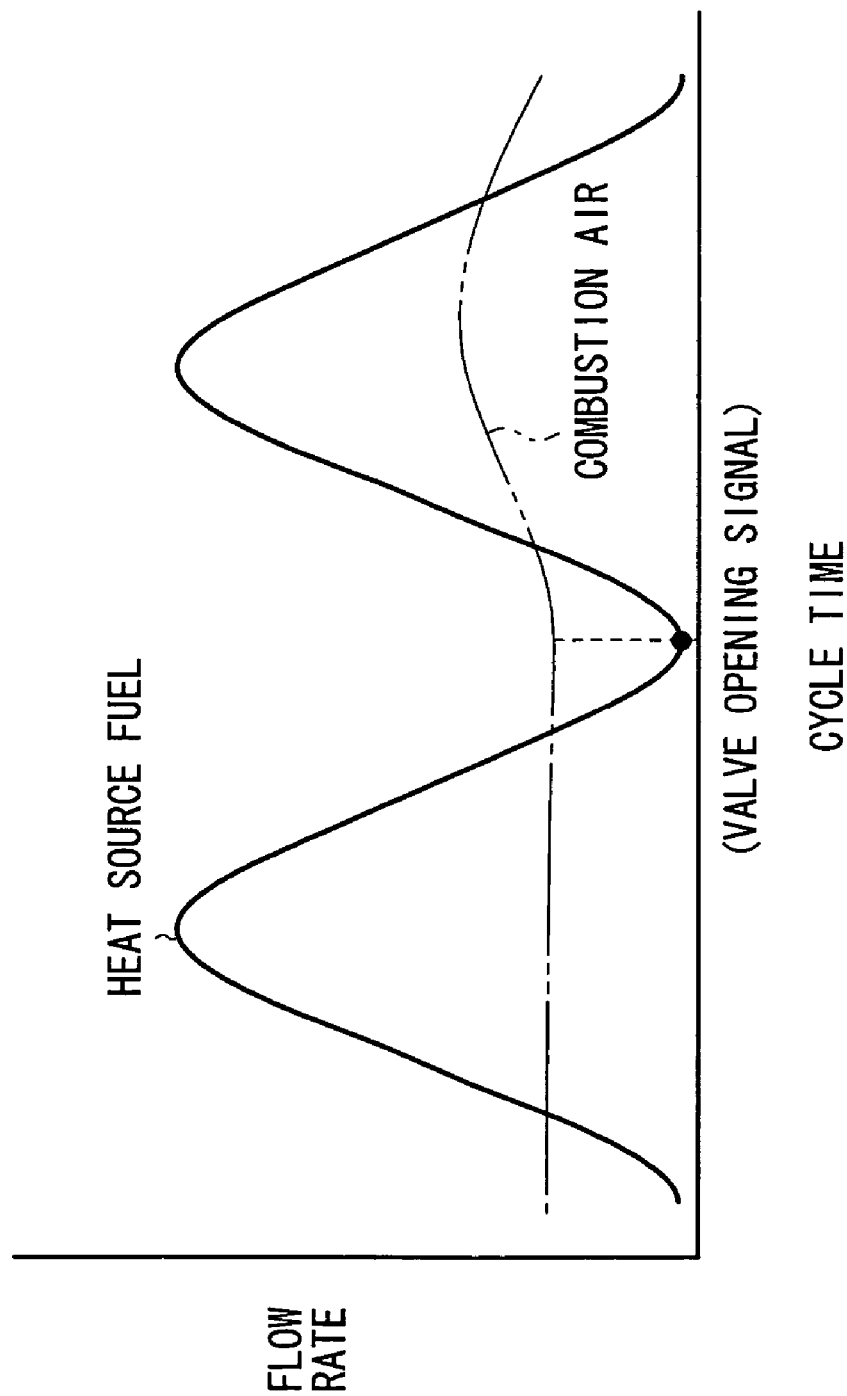
FIG. 7 is a graph showing relationship for controlling the flow rates of the heat source fuel and the combustion air when the PSA mechanism stopped according to the sequence.
Figure 8:
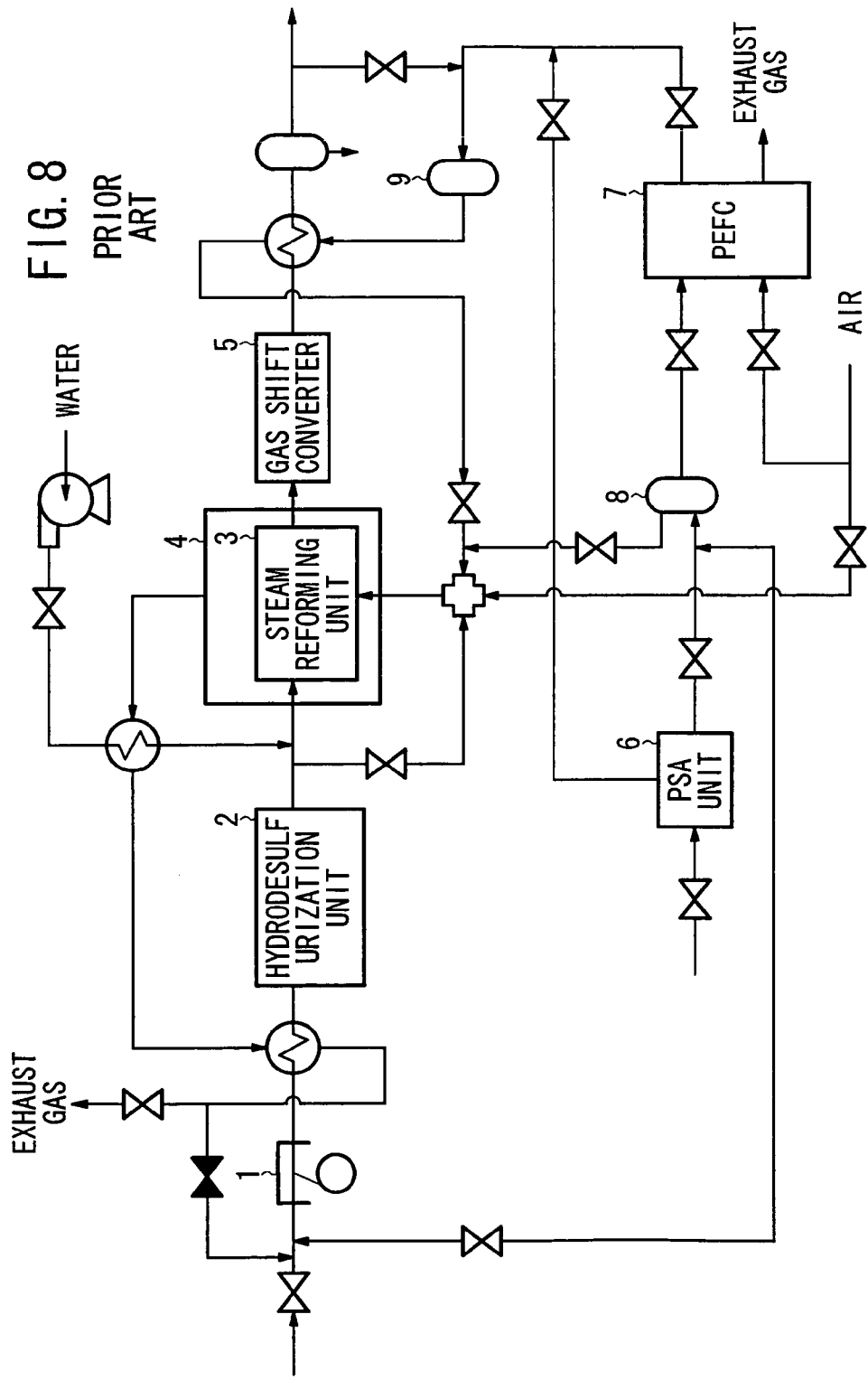
FIG. 8 is a diagram schematically showing a system of Japanese laid-open patent publication No. 2002-20102.

Thus, as shown in FIG. 7, the flow rate of the combustion air is maintained at a constant level regardless of the change in the flow rate of the heat source fuel. When a signal for opening a reference valve such as the valve 36a is outputted, the number of revolutions of the air compressor 52 is controlled according to an operation program which is selected beforehand (YES in step S9). In this manner, the amount of heat energy of the heat source fuel supplied to the combustion catalyst 14 and the amount of the combustion air supplied to the combustion catalyst 14 are controlled synchronously.

By continuously operating the fuel gas production apparatus 10 as described above, the fuel gas supplied from the PSA mechanism 26 is stored in the tank 46. As shown in FIG. 1, the fuel gas stored in the tank 46 is supplied to the fuel gas flow field in the fuel cell stack 64 in the fuel cell stack 64 when the valve 62 is open. Therefore, the fuel cell stack 64 can perform power generation using the fuel gas.

When the flow rate control valve 66 is open, the fuel gas supplied from the high pressure compressor 68 is filled in the high pressure tank 70. Then, the fuel gas is supplied from the high pressure tank 70 is supplied to the hydrogen dispenser 72. Thus, the hydrogen gas can be supplied to the unillustrated fuel cell automobile.

In the embodiment of the present invention, the combustion catalyst 14 is used as the heating unit. However, the present invention is not limited to use the combustion catalyst 14. Various heating means such as a burner can be used for carrying out the present invention.

According to the present invention, impurities are removed from the reformed gas in the PSA mechanism. The impurities are supplied continuously to the heating unit as the heat source fuel. At this time, the amount of the heat energy of the impurities supplied to the combustion catalyst is controlled synchronously with the amount of combustion air supplied to the combustion catalyst. When the amount of the heat energy of the impurities supplied to the combustion catalyst is decreased due to the pulsation of the PSA mechanism, the amount of combustion air supplied to the combustion catalyst is decreased.

Thus, even if the amount of the combustion air supplied to the heating unit is increased in contrast to the heat energy supplied to the heat source fuel, it is possible to prevent the temperature of the heating unit from being decreased. Combustible component is fully used in the heating unit. Therefore, no unused combustible component is discharged directly to the outside. The exhaust gas is clean.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of producing a hydrogen-rich fuel gas comprising the steps of:
    reforming a fuel to obtain a reformed gas;
    supplying said reformed gas to a pressure swing adsorption mechanism for removing impurities from said reformed gas to refine said reformed gas into the hydrogen-rich fuel gas;
    supplying said impurities to a heating unit as a heat source fuel, and supplying combustion air to said heating unit for inducing combustion; and
    controlling an amount of said combustion air supplied to said heating unit synchronously with the change in flow rate of said impurities supplied to said heating unit with a regulating element.

2. A fuel gas production method according to claim 1, wherein the amount of said combustion air supplied to a combustion catalyst is controlled by an air compressor and when said pressure swing adsorption mechanism has stopped previously according to a sequence, an operation program for controlling the amount of said combustion air supplied to said heating unit is started, and when said pressure swing adsorption mechanism has not stopped previously according to the sequence, operation of said air compressor is started at a constant number of revolutions which is a predetermined number or less.

3. A fuel gas production method according to claim 2, wherein after said operation program of said air compressor is started, temperature of said heating unit is detected, and if the detected temperature is not within a predetermined range of temperature, revolution of said air compressor is controlled.

4. A fuel gas production apparatus for reforming a fuel to produce a hydrogen-rich fuel gas, comprising:
    a vaporization mechanism having a combustion catalyst for vaporizing said fuel;
    a reforming mechanism for reforming said vaporized fuel to obtain a reformed gas;
    a pressure swing adsorption mechanism for removing impurities from said reformed gas to refine said reformed gas into the hydrogen-rich fuel gas;
    a supply passage for continuously supplying said impurities discharged from said pressure swing adsorption mechanism to said combustion catalyst or another unit which requires a heat source fuel;
    a regulating element coupled to said supply passage for regulating an amount of said impurities supplied to said combustion catalyst;
    a combustion air supply mechanism for supplying combustion air to said combustion catalyst; and
    a control unit programmed to control an amount of said combustion air supplied to said combustion catalyst synchronously with the change in flow rate of said impurities supplied to said combustion catalyst via said regulating element.

5. A fuel gas production apparatus according to claim 4, further comprising an air compressor for controlling the amount of said combustion air supplied to said combustion catalyst.

* * * * *